P. BROWN & F. J. BOSTOCK.
MACHINE FOR GRINDING WORMS AND THE LIKE.
APPLICATION FILED OCT. 8, 1913.

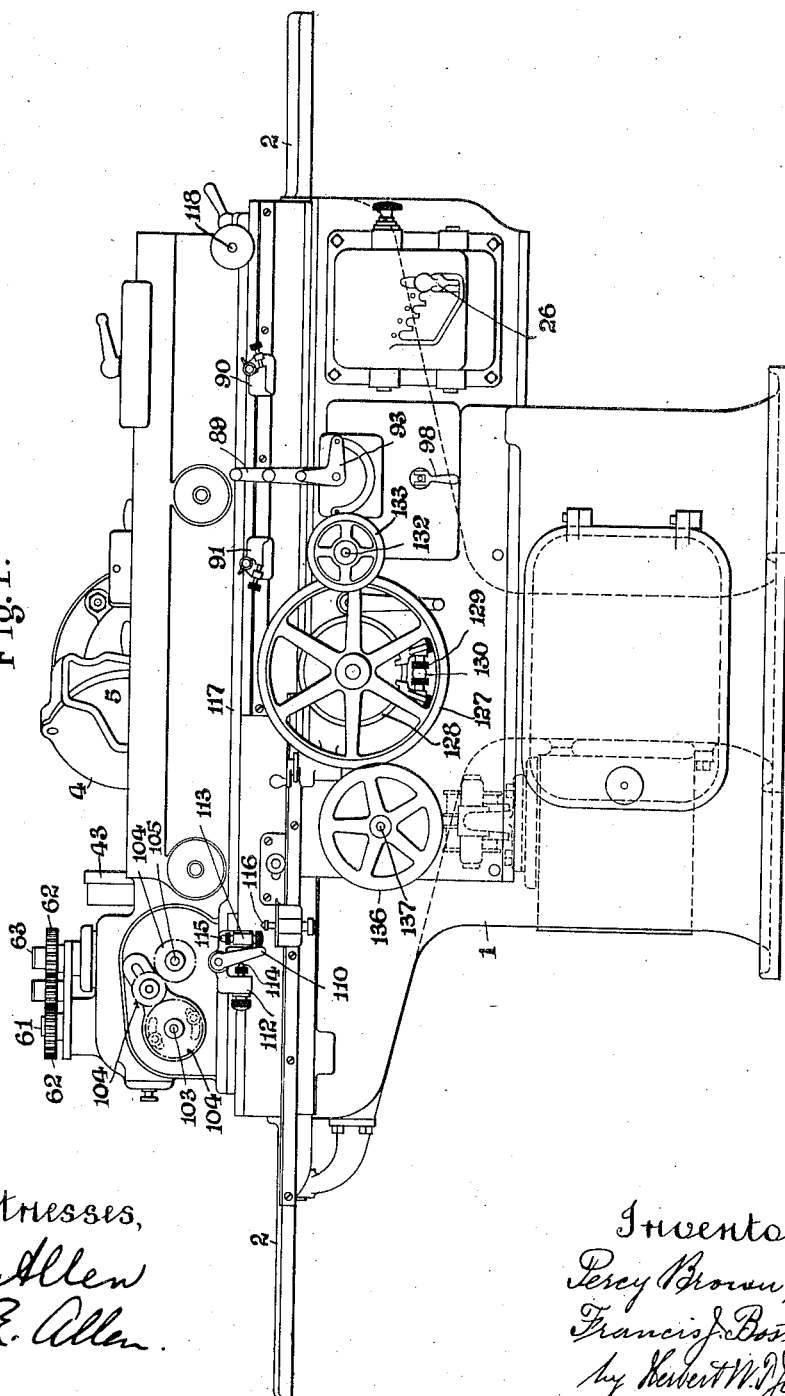

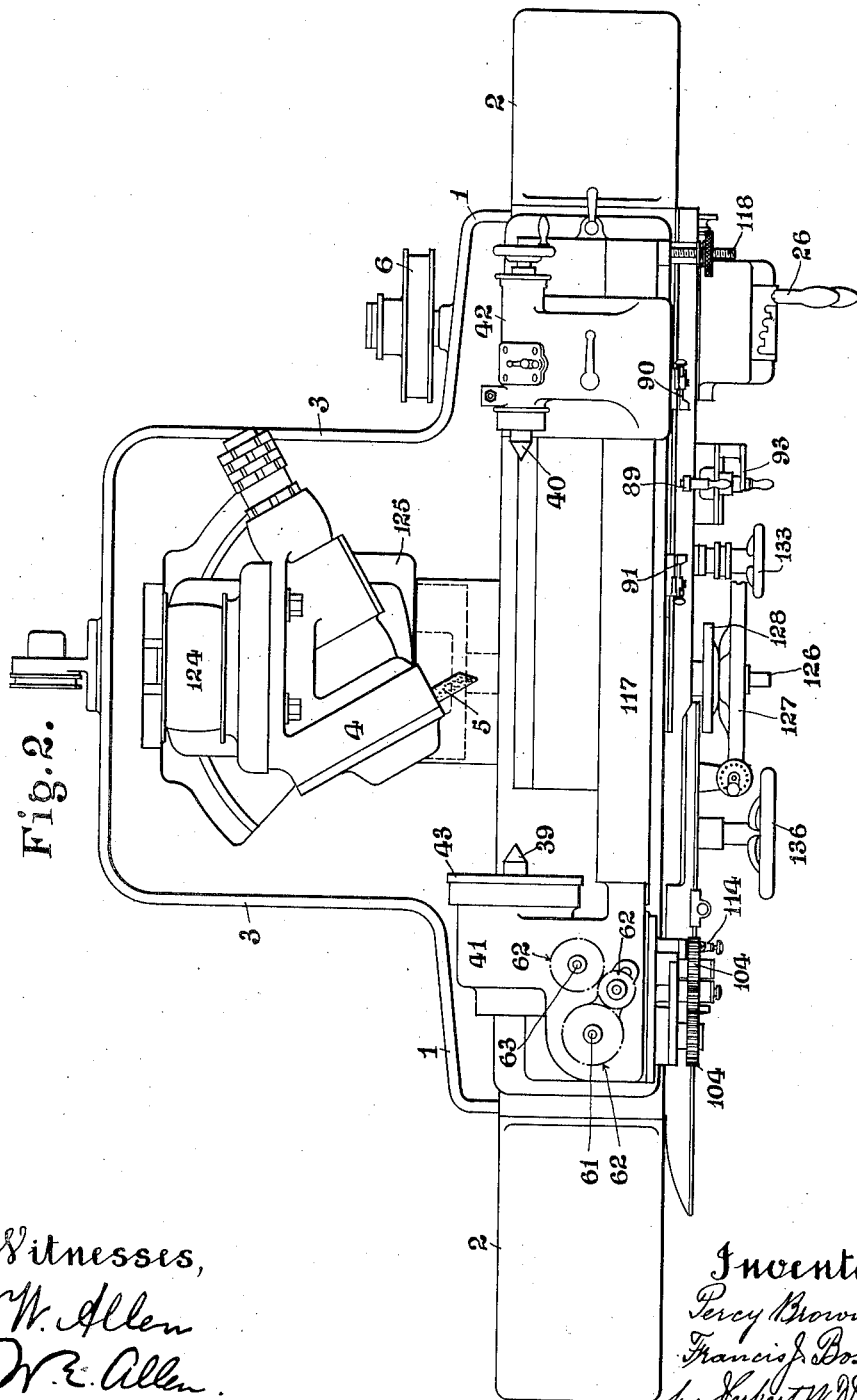

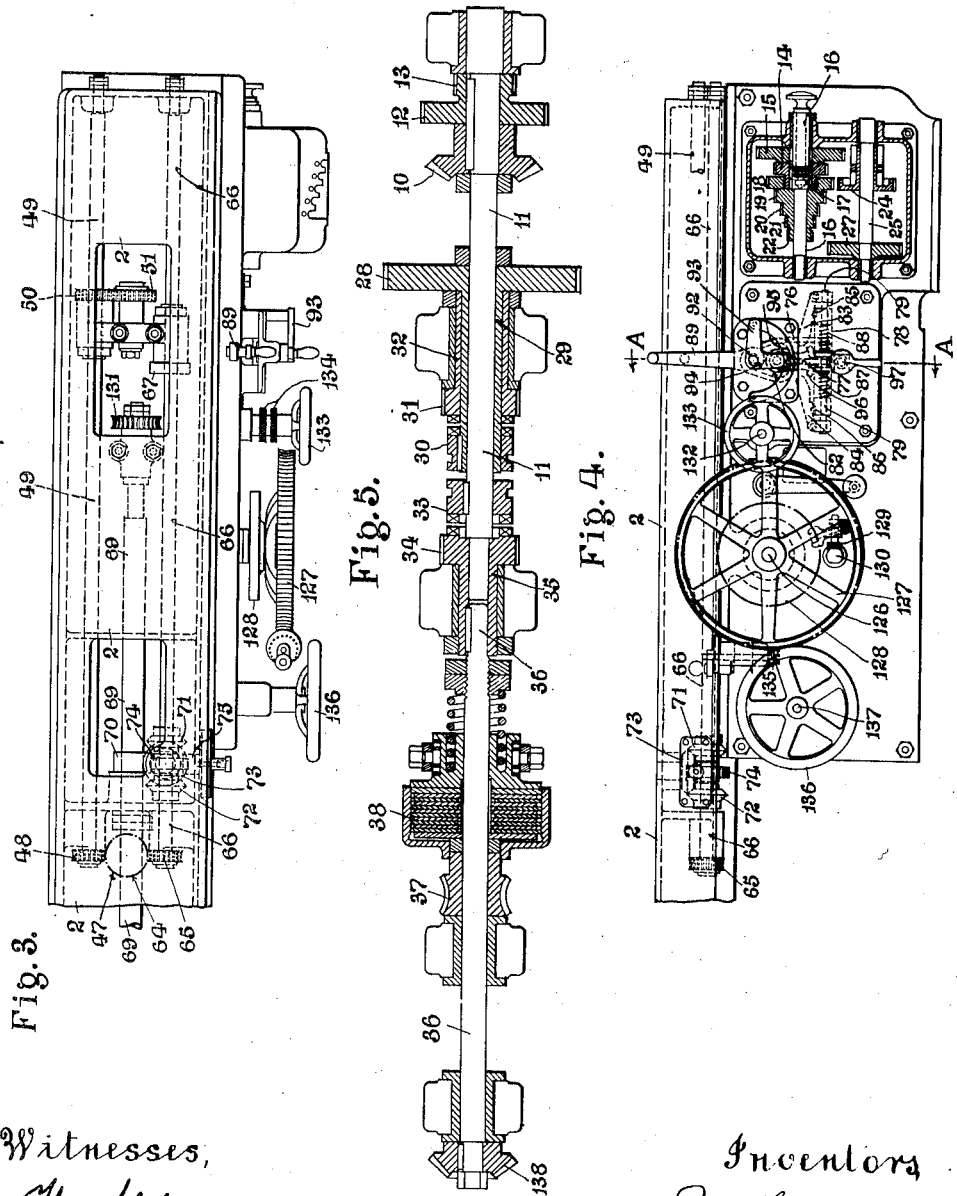

1,100,525.

Patented June 16, 1914.

7 SHEETS—SHEET 4.

Witnesses,
W. Allen
W. R. Allen.

Inventors,
Percy Brown, and
Francis J. Bostock,
by Herbert W. D. Jenner.
Attorney.

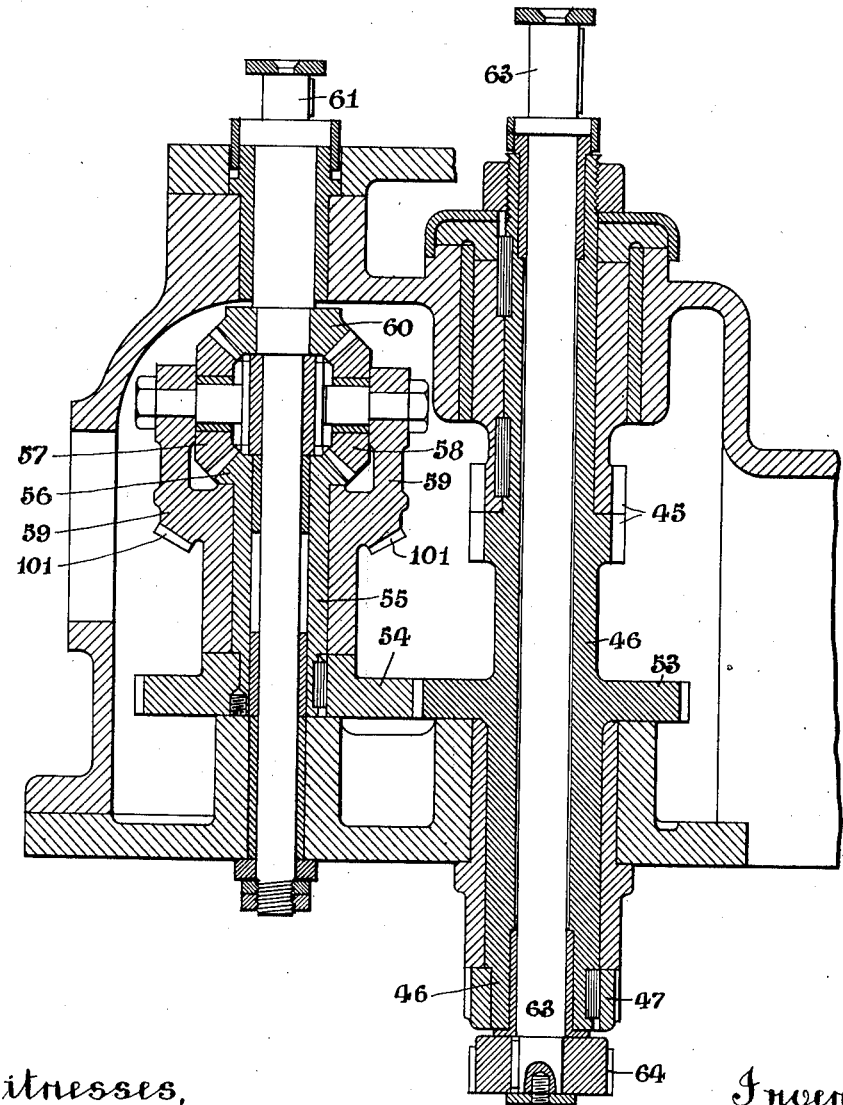

P. BROWN & F. J. BOSTOCK.
MACHINE FOR GRINDING WORMS AND THE LIKE.
APPLICATION FILED OCT. 8, 1913.

1,100,525.

Patented June 16, 1914.

7 SHEETS—SHEET 6.

Witnesses,
W. Allen
W. E. Allen

Inventors
Percy Brown, and
Francis J. Bostock,
by Herbert W. Jenner.
Attorney

P. BROWN & F. J. BOSTOCK.
MACHINE FOR GRINDING WORMS AND THE LIKE.
APPLICATION FILED OCT. 8, 1913.

1,100,525.

Patented June 16, 1914.

7 SHEETS—SHEET 7.

Witnesses,
W. Allen
W. E. Allen

Inventors,
Percy Brown, and
Francis J. Bostock,
by Herbert W. Jenner.
Attorney.

UNITED STATES PATENT OFFICE.

PERCY BROWN AND FRANCIS JOHN BOSTOCK, OF HUDDERSFIELD, ENGLAND.

MACHINE FOR GRINDING WORMS AND THE LIKE.

1,100,525.  Specification of Letters Patent. Patented June 16, 1914.

Application filed October 8, 1913. Serial No. 794,047.

*To all whom it may concern:*

Be it known that we, PERCY BROWN and FRANCIS JOHN BOSTOCK, subjects of King George V of Great Britain, residing at Huddersfield, in the county of York, England, have invented certain new and useful Improvements in Machines for Grinding Worms and the like, of which the following is a specification.

Our invention relates to the grinding of worms or the like to remove inaccuracies which may have developed during, say, the process of hardening, and our object is to provide for the purpose a new or improved machine of the abrasive wheel type which shall be entirely automatic in its action and by means of which the utmost precision will be obtainable.

In our improved machine the abrasive wheel, which is profiled to the same shape as the flank of the worm thread to be ground, is so mounted as to be easily placed in correct relation to the worm thread both as regards the spiral and pressure angle, and it is caused to feed laterally relatively to the worm, thereby enabling the correct shape of the worm thread to be retained.

For the purpose of enabling the various coöperating mechanisms which constitute the machine, and their action, to be clearly understood we shall in describing same refer to the accompanying drawings, in which:—

Figure 6:
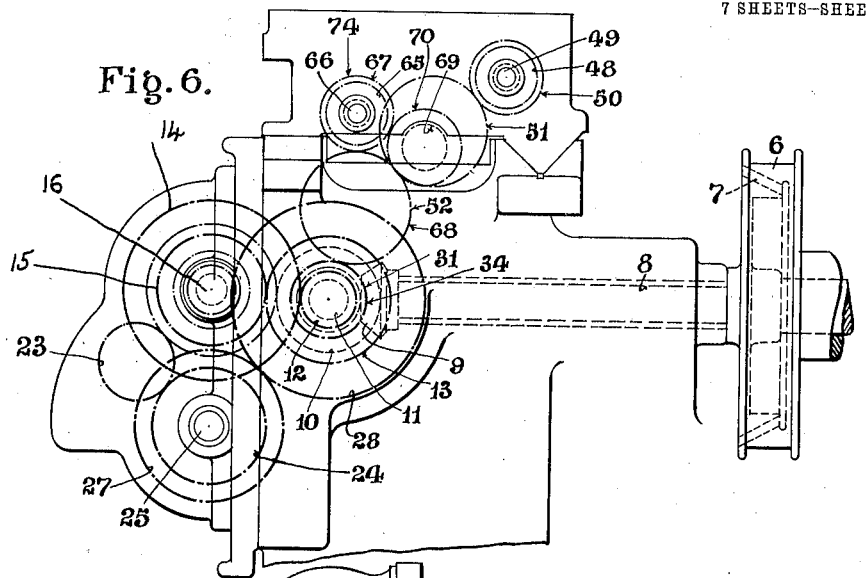
Figure 7:
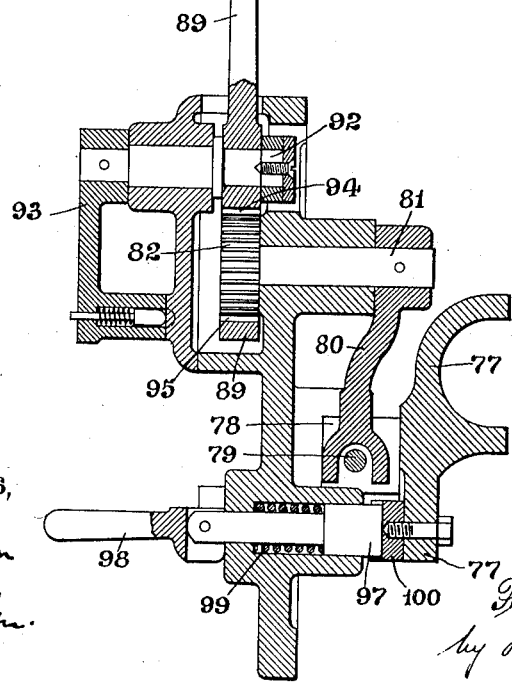
Figure 10:
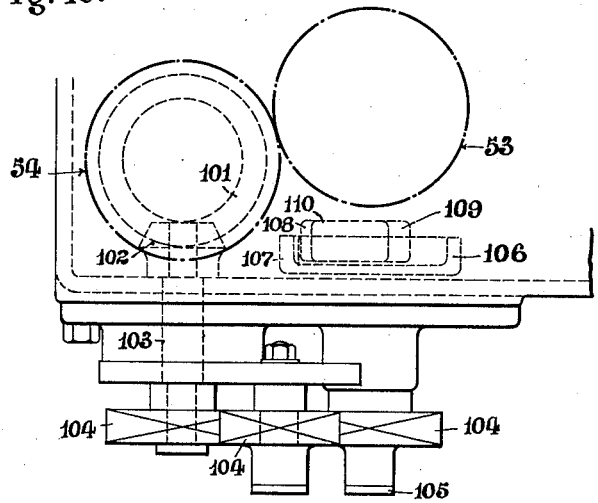
Figure 9:
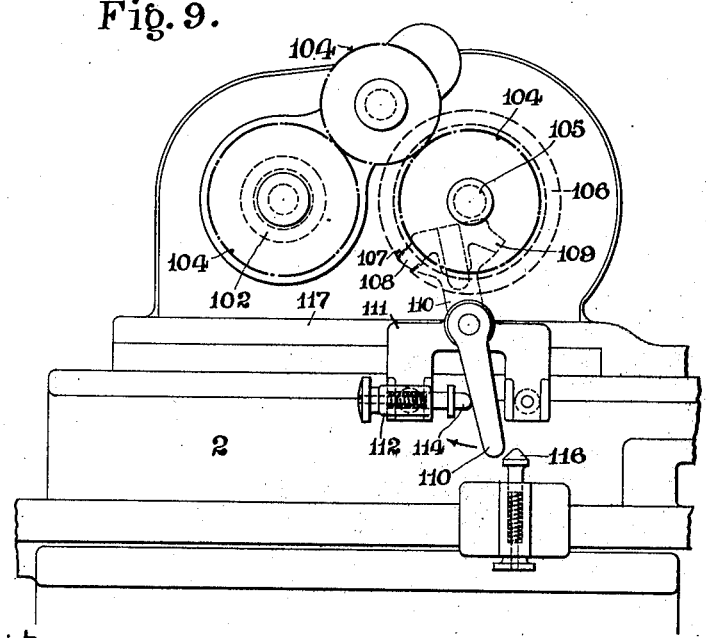
Figure 11:
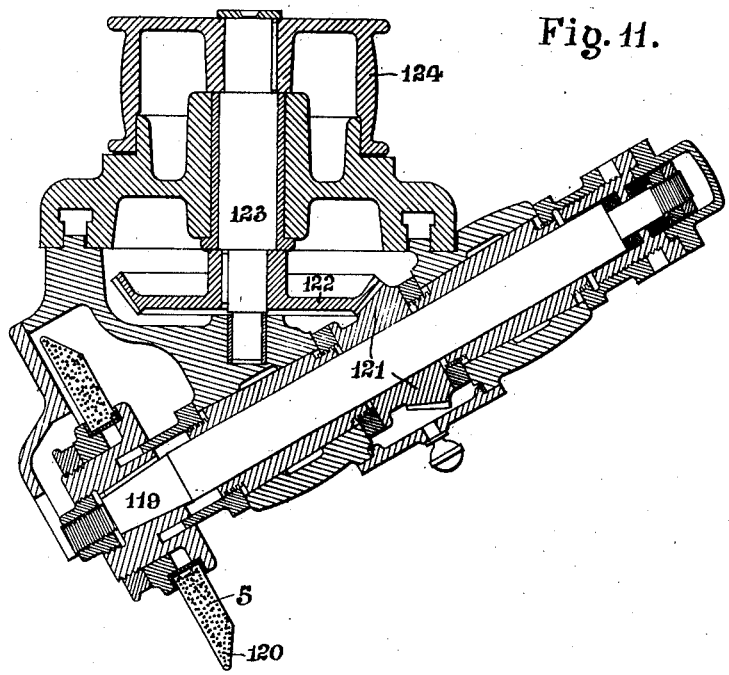
Figure 12:
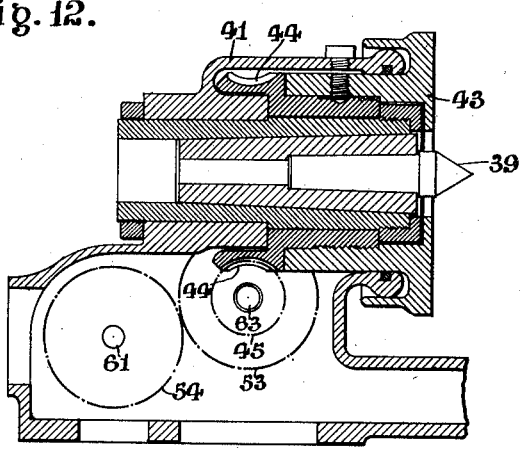

Figure 1 is a front elevation of our improved machine; Fig. 2 is a plan view; Fig. 3 is a plan view on an enlarged scale of the work table and its traversing mechanism; Fig. 4 is a front view, of most of the parts shown in Fig. 3, the speed gear box being shown in section; Fig. 5 is a longitudinal section of the gear or drive shaft; Fig. 6 is a partial end view of the machine showing the main drive and the manner in which motion is conveyed to the gear shaft and thence to the work table driving mechanism; Fig. 7 is a section on the line A—A, Fig. 4, of the traverse trip gear arrangement and the arresting device therefor, the latter being shown in a different position from that shown in Fig. 4 with the block 113, plunger 115, and other parts omitted; Fig. 8 is a vertical section of the differential gear by means of which the indexing of the work is effected; Fig. 9 is a detail showing the index trip gear and the arrangement by means of which it is enabled to operate when grinding worms of either right or left hand spiral; Fig. 10 is a part plan view of Fig. 9, showing the connection to the differential gear; Fig. 11 is a sectional plan view of the abrasive wheel head, and Fig. 12 is a sectional plan view of the fixed headstock showing the construction and arrangement thereof and the method of transmitting motion to the driving plate from the differential gear.

Referring to the drawings, the machine comprises a suitable bed 1 on which is supported a longitudinally movable work table 2. A rearward extension 3 of the bed carries an abrasive wheel head 4 which is capable of being slid toward and away from the work table, and also of being swung on a center for the purpose of positioning the abrasive wheel 5 with respect to the work.

The main drive of the machine is through a single pulley 6 (Fig. 6) which transmits motion through a friction clutch 7, shaft 8, and bevel wheel 9 to a bevel wheel 10 fast on a gear shaft 11 (see Figs. 5 and 6). Spur gears 12 and 13 on the shaft 11 mesh with gears 14 and 15 loose on a shaft 16 but capable, either of them, of being rotatively connected thereto by a clutch 17. Fast on the shaft 16 are a series of spur gears 18, 19, 20, 21, 22, any one of which may be connected through a carrier wheel 23 (Fig. 6) with a gear 24 rotatively connected to a shaft 25 and slidable thereon by means of a change lever 26, said shaft 25 being thus capable of being driven, in the instance shown, at any one of ten speeds. Any other suitable form of change speed mechanism may be substituted for that shown and any desired range of speeds may be provided. A gear 27 fast on the shaft 25 meshes with a gear 28 fast on a sleeve 29 on the gear shaft 11, and a clutch 30 fast to and slidable on said sleeve 29 is capable of being moved into driving engagement with a pinion 31 on a sleeve 32 loosely rotatable on the sleeve 29. A clutch 33 fast to and slidable on the shaft 11 is capable of being moved into driving engagement with a pinion 34 carried by a sleeve 35 loosely rotatable on the shaft 11 and said sleeve 35 is rotatively secured to a second gear shaft 36 lineable with the shaft 11. A worm wheel 37 loosely mounted on the shaft 36 is capable of being driven therefrom by means of a friction clutch 38.

In describing the various motions of the machine, we will commence with those concerning the traversing and indexing of the work. The worm to be ground is mounted between fixed centers 39 and 40 respectively carried by fixed and loose headstocks 41 and 42 (Fig. 2). A driving plate 43 on the headstock 41 has attached to or integral with it a worm wheel 44 (see Fig. 12) with which meshes a worm 45 on a sleeve 46 (Fig. 8). This sleeve carries at its lower end a worm 47 which meshes with a worm wheel 48 (Fig. 3) fast on a shaft 49 extending longitudinally of and suported in suitable bearings beneath the work table 2. A gear 50 supported in a fixed bearing is connected with the shaft 49 by key and feather, and meshes through a gear 51 and an intermediate gear 52 (Fig. 6) with the pinion 31 on the sleeve 32. Motion can thus be conveyed to the shaft 49 at any one of the speeds provided for by the change speed gearing. Reverting now to Fig. 8, the sleeve 46 carries a gear 53 which meshes with a gear 54 keyed to a sleeve 55 carrying a bevel pinion 56 which meshes with bevel pinions 57 and 58 carried by a casing 59. A bevel pinion 60 also meshing with the pinions 57 and 58 is fast to a vertical shaft 61 which is connected through change wheels 62 (see Figs. 1 and 2) with a vertical shaft 63 extending within the sleeve 46. The lower end of the shaft 63 has fast thereon a worm 64 which meshes with a worm wheel 65 (see Fig. 3) on a shaft 66 extending longitudinally of and supported in suitable bearings beneath the work table 2. A gear 67 carried by a suitable fixed bearing is rotatably connected to the shaft 66 by key and feather and meshes through an intermediate gear 68 with the pinion 34 on sleeve 35. Motion can thus be conveyed direct to the shaft 66 from the gear shaft 11 through clutch 33. A lead screw 69 mounted in suitable fixed bearings beneath the table 2 passes through gear 70 mounted on a suitable bearing carried by the table.

When making the cutting stroke, motion is conveyed through the change speed gearing and clutch 30 to the shaft 49 and this motion is transmitted through sleeve 46 to the differential motion and thence through the lead change wheels 62 to the vertical shaft 63 from which it passes through worm 64 and worm wheel 65 to the shaft 66. As before stated, the worm 45 on the sleeve 46 causes the driving plate 43 to slowly rotate the work, and in order to drive the lead screw 69 in the required direction according to the hand of the worm being ground to give the desired lead, we provide on the shaft 66 two bevel wheels 71 and 72 one of which, say the wheel 71, is fast on the shaft while the other is loose upon the shaft but is prevented from moving endwise thereon. The said wheels mesh with a common bevel 73 so that the wheel 72 will revolve in the opposite direction to the wheel 71. A gear 74 mounted loosely on the shaft 66 between the wheels 71 and 72 and having clutch members on its opposing faces, is capable of being moved by hand by means of a forked arm 75 into driving engagement with one or other of two clutch members formed on the respective faces of the wheels 71 and 72, so that said gear 74 will be driven in one or other direction. The gear 74 meshes with the gear 70 and as the lead screw 69 passes through said gear 70 the nut will travel along the screw in one or the other direction according to the position of the gear 74 and the table 2 will be moved to give lead to the work in the required direction.

As will be understood from the description given above, a selected slow speed is given to the worm during the cutting stroke through the change speed gearing and clutch 30 and a quick return is given by a direct drive through clutch 33 from the high speed. Automatic reversal at the end of each stroke is effected as follows:—Clutch levers 76 and 77 respectively controlling the clutches 30 and 33 are formed on or connected to a block 78 through projections on which passes a rod 79 slidable horizontally in suitable bearings. Entering between collars fast on the rod 79 is the lower end of a lever 80 fast at its upper end on a stud 81 on which is also fast a toothed pinion 82 rotation of which will cause the rod 79 to be moved endwise as will be understood. Pivotally attached to the bearings in which the rod 79 moves are two catch levers 83 and 84 and formed on the block carrying the clutch levers are two catches 85, 86, with which said catch levers are adapted to respectively engage when the rod is moved endwise. In the positions shown on the drawings, the clutches 30 and 33 and the catch levers 83, 84 are shown as being both disengaged but it will be understood that in the active working of the machine one or other of the clutches would always be in gear (except when arbitrarily held out as hereafter described).

During the cutting stroke the clutch 30 would be in gear and the catch lever 84 would be in engagement with the catch 86 and during the return stroke the clutch 33 would be engaged and the catch lever 83 would be in engagement with the catch 85. Just before disengagement of the clutch 30, a coiled spring 87 on the rod is compressed, so that on release of the catch lever 84 the spring 87 acts to force the rod endwise to disengage the clutch 30 and move the clutch 33 into engagement. Similarly when the clutch 33 is moved into engagement a spring 88 is compressed and is ready to act to shoot over the clutches on disengagement of the catch lever 83. It is necessary, whichever hand of worm is being ground, that is to say, in whichever direction the work table is moving during the cutting stroke, that at the completion of the cutting stroke the clutch 30 be moved out of gear and the clutch 33 be moved into gear, and vice versa on the return stroke. To enable this to be done we provide a traverse trip lever 89 adapted to be engaged at either end of the traverse by an adjustable stop 90 or 91 (see Figs. 1 and 2) and we mount the said lever on an eccentric fulcrum 92 which fulcrum can be rotated by means of a hand lever 93. The lever 89 has two oppositely toothed portions 94 and 95 and according to the positioning of the fulcrum 92 the lever will be raised or lowered to put one or other of such toothed portions into mesh with the pinion 82. It can thus be arranged, no matter which direction the table be traveling in, that at the end of the cutting stroke the pinion 82 can be rotated in a direction to cause the segmental portion 96 of the lever 80 to disengage the catch lever 84 and allow the spring 87 to act to disengage the clutch 30 and move the clutch 33 into engagement to start the return movement of the table, and simultaneously on completion of the return movement to cause the clutch 33 to be disengaged and the clutch 30 to be moved into engagement.

In order to enable the movements of the machine to be arrested when it is desired to gage the work that is being ground, we provide a spring actuated plunger 97 (Figs. 4 and 7) controlled by a handle 98. When the handle is raised as is shown in Fig. 7, the spring 99 acts to press the plunger 97 rearwardly and into the path of a projection 100 on the clutch lever 77. As the rod 79 moves endwise at the end of the quick return stroke, next following the permitted rearward movement of the plunger, said plunger engages the projection 100, and prevents the insertion of the clutch 30 thus bringing the machine to rest. After the work has been gaged, withdrawal of the plunger by means of the handle 98 permits the rod to complete its endwise movement to insert the clutch 30 and the cycle of functions of the machine is resumed.

The work is indexed to present a fresh portion or thread to the abrasive wheel during the quick return movement of the work table and is effected as follows:—A bevel gear 101 formed on or attached to the casing 59 of the differential motion (Fig. 8) meshes with a bevel gear 102 (Figs. 9 and 10) the shaft 103 of which is connected through a train of change gearing 104 with a shaft 105 on which is mounted a flanged stop disk 106 having in its flange a recess 107 into which one or other of two stops 108 and 109 carried by a pivoted stop lever 110 may engage. During the cutting stroke the stop disk 106 is held fast and consequently, as will be understood the casing 59 of the differential motion is prevented from rotating. At the end of the cutting stroke the stop disk 106 is released and the casing 59 is thus free to be carried around by the pinions 57 and 58 as will be understood. The rotation of the casing 59 causes the pinion 60 which at this time is the driving pinion, to exert less power on the pinion 56, which is now the driven pinion, and the speed of the sleeve 46 carrying the work driving worm 45 is thus reduced causing the backward rotation of the work to be retarded so long as the casing is free to revolve. This time is determined by the change gearing 104 which through the rotation of the bevel wheel 102 as the casing 59 revolves, causes the stop disk 106 to revolve at a selected speed, and when the said disk has made one revolution the stop 108 or 109 for the time being in action reëngages in the recess 107 and locks the disk and consequently locks the casing 59. It will thus be obvious that by suitably arranging the change wheels 104 any desired division may be given to the work during each return stroke.

In connection with the indexing of the work the same essential applies as in the traversing thereof, namely, that the indexing arrangement must be capable of being brought into operation at the end of the cutting stroke no matter which direction the work table may be moving during such stroke. This is provided for by the pivoted stop lever 110 and the two segmentally arranged stops 108 and 109 carried thereby. A bracket 111 has two depending portions one on either side of the center of the stop lever. These depending portions respectively carry blocks 112 and 113 and having therein spring actuated plungers 114 and 115 and either block may at will be adjusted to cause its plunger to occupy an operative position (see Figs. 1 and 9) where the plunger 114 is operative. The operative plunger bears against the stop lever as shown in Fig. 9 and holds it in such a position that the stop 108 is maintained in engagement with the stop disk until said stop lever is engaged by an adjustable stop 116 at the end of the cutting stroke whereupon the stop lever is rocked against the pressure of the spring plunger and the stop is removed from engagement with the disk. The disk makes one revolution and the pressure of the spring plunger when the recess in the stop disk is again presented opposite the stop, causes the stop to reëngage in the recess and hold the disk locked until the end of the next cutting movement. If the cutting movement be in the opposite direction, the plunger 114 will be moved to an inoperative position and the plunger 115 turned into an operative position. This will cause the stop lever to be turned into such a position that the stop 109 will engage the stop disk, and the adjustable stop 116 will be so disposed as to engage the stop lever at the required time to release the stop 109 and permit of the rotation of the casing 59 as has been described.

It will be observed that the drive for the traversing and rotation of the work is, on the cutting stroke, through the shaft 49 while on the return stroke, it is through the shaft 66. Since the shaft 49 is driven from the shaft 11 through pinion 31 and gears 52 and 51, and the shaft 66 is driven from the shaft 36 through pinion 34 and gear 68 it follows that the two shafts revolve in opposite directions and by driving from them alternately for the two directions of traverse and rotation of the work, all backlash is entirely eliminated which is a very important and advantageous feature of the machine.

The top table 117 carrying the fast and loose headstocks is pivoted at one end to the work table 2 and can be adjusted with respect thereto by means of a screw 118 to enable the work supporting centers 39 and 40 to be set at any desired angle.

Turning now to the abrasive wheel and head and the operating mechanisms therefor, the abrasive wheel 5 is mounted on a spindle 119 revolubly supported in the head 4 at a suitable angle, and its profile 120 is suitably shaped to suit the thread of the worm, to be ground. The abrasive wheel is rotated by means of a bevel pinion 121 fast on the spindle 119 which pinion 121 meshes with a bevel wheel 122 fast on a shaft 123 carrying a belt pulley 124 to which motion is communicated by belt from any convenient source. The underside of the slide 125 carrying the head 4 is provided with a nut, not shown, through which passes a screw shaft 126 extending to the front of the machine and having fast on its front end a hand wheel 127. A disk 128 forming part of or attached to the hand wheel 127 carries an adjustable micrometer stop 129 which is adapted to engage a fixed stop 130 to limit the rotation of the screw shaft 126 in one direction or the other according as the stop 129 be placed to one side or the other of the stop 130. A worm, not shown, on the screw shaft 126 meshes with the worm wheel 37 (Fig. 5) and the rotation of the said worm wheel will, at the commencement of the cutting stroke, cause the abrasive wheel head 4 to be moved slowly toward the work until the adjustable stop 129 engages the fixed stop 130. During the remainder of the cutting stroke the friction clutch 38 will slip and allow the screw shaft 126 to remain at rest with the stop 129 in contact with the stop 130 until reversal of motion takes place. On the clutch 33 being put into driving engagement at the end of the cutting stroke the worm wheel 37 is caused to revolve quickly, owing to the direct drive, and the slide 125 is quickly withdrawn at the moment of reversal to move the abrasive wheel clear of the work. A spring may be employed to assist in pulling back the abrasive wheel slide. A worm wheel 131 on the lead screw 69 is engaged by a worm not shown on a shaft 132 extending to the front of the machine and provided with a hand wheel 133 by means of which the lead screw may be rotated to move the work table to feed the work laterally against the abrasive wheel, independently of the automatic traverse given to the work table by the means previously described. Preferably the wheel 133 is provided with a micrometer adjustment 134 to permit of delicate feed being applied, and this feed may be made automatic by a ratchet connection from the lever 89.

A hand operated worm 135 meshing with worm wheel teeth on the periphery of the hand wheel 127 enables the abrasive wheel slide to be positioned accurately. The lateral feeding together of the abrasive wheel and the work is an important feature in as much as it enables the correct shape of the worm thread to be retained, which cannot be done in the present constructions of cylindrical grinders.

When it is not desired to operate the machine automatically a hand wheel 136 is provided mounted on a shaft 137 on which is fast a bevel wheel not shown, adapted to mesh with a bevel wheel 138 on the gear shaft 36.

The details of construction and arrangement of the various parts and motions constituting the machine may be varied.

Having thus described our invention, what we claim as new and desire to secure by Letters Patent is:—

1. In a grinding machine, the combination, with two shafts, and driving devices for revolving them at relatively different speeds; of a stationary guide, a pair of headstocks, for supporting the work, slidable longitudinally in the said guide, driving mechanism for sliding the headstocks in one direction connected to one shaft, driving mechanism for sliding the headstocks in the reverse direction connected to the other shaft, means for revolving the work in the headstocks, and means for periodically and automatically placing the two shafts in engagement alternately with their respective driving devices.

2. In a grinding machine, the combination, with two shafts, and driving devices for revolving them at relatively different speeds; of a stationary guide, a pair of headstocks, for supporting the work, slidable longitudinally in the said guide, driving mechanism for sliding the headstocks in one direction connected to one shaft, driving mechanism for sliding the headstocks in the reverse direction connected to the other shaft, means for revolving the work in the headstocks, means for periodically and automatically placing the two shafts in engagement alternately with their respective driving devices, and means for reversing the direction of the motion of the driving devices which slide the headstocks, so that they may be slid more quickly to the right or to the left at will.

3. In a grinding machine, the combination, with two shafts, and driving devices for revolving them at relatively different speeds; of a stationary guide, a pair of headstocks, for supporting the work, slidable longitudinally in the said guide, driving mechanism for sliding the headstocks in one direction connected to one shaft, driving mechanism for sliding the headstocks in the reverse direction connected to the other shaft, means for revolving the work in the headstocks, means for periodically and automatically placing the two shafts in engagement alternately with their respective driving devices, differential gearing and connections which index the work automatically during the quicker sliding movement of the headstocks, and stop mechanism which holds the differential gearing inoperative during the slower sliding movement of the headstocks.

4. In a grinding machine, the combination, with two shafts, and driving devices for revolving them at relatively different speeds; of a stationary guide, a work-table slidable longitudinally in the guide, a pair of headstocks pivotally connected with the work-table, means for setting the axis of the headstocks at various angles with the line of motion of the work-table, driving mechanism for sliding the work-table in one direction connected to one shaft, driving mechanism for sliding the work-table in the reverse direction connected to the other shaft, means for revolving the work in the headstocks, and means for periodically and automatically placing the two shafts in engagement alternately with their respective driving devices.

5. In a grinding machine, the combination, with two shafts, and driving devices for revolving them at relatively different speeds; of a stationary guide, a pair of headstocks, for supporting the work, slidable longitudinally in the said guide, driving mechanism for sliding the headstocks in one direction connected to one shaft, driving devices for sliding the headstocks in the reverse direction connected to the other shaft, means for revolving the work in the headstocks, means for periodically and automatically placing the two shafts in engagement alternately with their respective driving devices, and a manually-controlled stop-mechanism which operates automatically to stop the machine at one end of the quicker sliding movement of the headstocks.

6. In a grinding machine, the combination, with two shafts, and driving devices for revolving them at relatively different speeds; of a stationary guide, a pair of headstocks, for supporting the work, slidable longitudinally in the said guide, driving mechanism for sliding the headstocks in one direction connected to one shaft, driving mechanism for sliding the headstocks in the reverse direction connected to the other shaft, means for revolving the work in the headstocks, means for periodically and automatically placing the two shafts in engagement alternately with their respective driving devices, a revoluble grinding wheel, a support for the grinding wheel, and means for sliding the grinding wheel and its support laterally of the axis of the headstocks.

In testimony whereof we affix our signatures in the presence of two witnesses.

PERCY BROWN.
FRANCIS JOHN BOSTOCK.

Witnesses:
T. E. WHITELEY,
C. E. HINCHLIFF.